United States Patent [19]
Surdi et al.

[11] Patent Number: 5,737,977
[45] Date of Patent: Apr. 14, 1998

[54] SELECTIVELY RELEASABLE TOE CLIP

[76] Inventors: Richard J. Surdi, 8479 Pioneer Trail, Fishers, Ind. 46038; Mark L. Stow, 6328 Massachusetts Ave., Indianapolis, Ind. 46218

[21] Appl. No.: 644,004

[22] Filed: May 9, 1996

[51] Int. Cl.$^6$ .................................................. G05G 1/14
[52] U.S. Cl. .............................. 74/594.6; 74/594.4
[58] Field of Search .................... 74/594.4, 594.6; 36/131, 132; D12/125

[56] References Cited

U.S. PATENT DOCUMENTS

| | | | |
|---|---|---|---|
| D. 319,038 | 8/1991 | St. John | D12/125 |
| 557,025 | 3/1896 | Ruden | 74/594.6 |
| 588,038 | 8/1897 | Tudor. | |
| 615,679 | 12/1898 | Condell | 74/594.6 |
| 630,743 | 8/1899 | Rush | 74/594.6 |
| 934,064 | 9/1909 | Frankenburg | 74/594.6 |
| 3,357,719 | 12/1967 | Gottfried. | |
| 4,103,563 | 8/1978 | Genzling. | |
| 4,327,602 | 5/1982 | Le Bee. | |
| 4,809,563 | 3/1989 | Loppnow | 74/594.6 |
| 4,889,010 | 12/1989 | Ross | 74/594.6 |
| 4,898,064 | 2/1990 | Romano | 74/594.4 |
| 4,969,375 | 11/1990 | v.d. Osten-Sacken et al. . | |
| 5,078,026 | 1/1992 | Giffin. | |
| 5,456,138 | 10/1995 | Nutile et al. | 74/594.6 |

FOREIGN PATENT DOCUMENTS

| | | | |
|---|---|---|---|
| 3221429 A1 | 12/1983 | Germany | 74/594.6 |
| 3306925 A1 | 8/1984 | Germany | 74/594.6 |
| 1-208291 | 8/1989 | Japan. | |
| 3-243488 | 10/1991 | Japan. | |
| 4-195824 | 12/1993 | Japan. | |
| 17468 | 7/1897 | United Kingdom | 74/594.6 |

*Primary Examiner*—Vinh T. Luong
*Attorney, Agent, or Firm*—Bose McKinney & Evans

[57] ABSTRACT

A toe clip is designed for placement on a pedal for facilitating disengagement of a user's foot. The toe clip includes a foot strap member for capturing a user's foot. The strap member includes strap elements for engaging surfaces of the user's foot. A coupler is provided for selectively coupling the foot strap member to the pedal for facilitating the release of the user's foot from its capture by the toe clip. The coupler includes a bracket member coupled to the pedal, and a magnet member coupled with the bracket member. The coupler also includes a release member coupled to the foot strap member and magnetically coupled to the magnet member. A hinge is provided for hingedly coupling the release member to the bracket member, and a spring is provided for biasing the release member into engagement with the magnet member.

17 Claims, 7 Drawing Sheets

SELECTIVELY RELEASABLE TOE CLIP

I. TECHNICAL FIELD OF THE INVENTION

The present invention relates to sporting goods, and more particularly to a toe clip for use on vehicles, such as bicycles that have a pedal.

II. BACKGROUND OF THE INVENTION

Pedal driven vehicles, such as bicycles, have existed since well before the turn of the century. The pedal used to drive a bicycle usually comprises a platform that is engaged by the plantar surface of a user's foot. The pedal is rotatably joined to a crank, which itself is fixedly coupled to a sprocket that is rotatable about an axis. Although tricycles and many unicycles include a direct coupling between the pedal crank and the wheel to be rotated, most bicycles operate through a sprocket mechanism. An endless chain is typically carried on the sprocket, and couples the sprocket to a second sprocket mounted on the driving wheel of the device.

One difficulty encountered with the use of conventional platform-like pedals is that they limit the efficiency of the transmission of power from the user's foot to the pedal. This inefficiency occurs because the pedal usually only engages the plantar surface of the user's foot. As such, the user can only exert a rotary force to the pedal by "pushing" the pedal during the "downstroke" portion of the pedal's rotary cycle. If the user were to exert a pulling force on the pedal during the upstroke portion, the lack of a connection between the dorsal surface of the user's foot and the pedal would cause the user's foot to become disengaged from the pedal, and thereby cause no rotary force to be applied to the pedal.

Toe clips enable the user to exert force upon the pedal during both the downstroke and the upstroke portion of the pedal's rotary cycle. Most conventional toe clips comprise a type of three sided, partial cage, having an open rear end, that permits the user to insert the forward (distal) portion of his foot into the interior of the cage. The toe clip is coupled to the pedal, such that when the user has his foot engaged into the toe clip, the plantar surface of the user's foot engages the upper surface of the pedal. Straps which form the cage of the toe clip extend around the forward portion of the user's foot, and over the top (dorsal) surface of the user's foot. Usually, two sets of straps are used. A first strap connects to the forward (leading) edge of the pedal, and includes a first portion for engaging the distal portion of the plantar surface of the user's foot. A second portion extends perpendicularly upwardly across the front of the user's toes. The third portion extends generally parallel to the first portion, and is provided for engaging the distal portion of the dorsal surface of the user's foot. The second strap is a lateral strap that is coupled to the pedal, and includes a first portion for engaging the medial surface of the user's foot, a second portion which engages the first strap adjacent to the dorsal surface of the user's foot near the user's instep, and a third portion which engages the lateral surface of the user's foot. The third portion may include an adjustment means, such as a buckle, so that the user can adjust the toe clip to better fit his particular foot. The configuration of existing toe clips permits them to effectively capture the distal portion of the user's foot. This capture of the user's foot serves two purposes. First, the engagement of the dorsal surface of the user's foot to the strap of the toe clip enables the user to exert force upon the toe clip (and hence the pedal) during the "upstroke" portion of the pedal's rotary cycle.

The second advantage of the toe clip is that the engagement of the toe clip with the plantar, medial, and lateral surfaces of the foot helps to prevent the user's foot from becoming disengaged from the pedal. Although this second advantage does help to enhance the efficiency of the power transfer from the user's foot and leg to the pedal, it also has some drawbacks. One drawback is that the effective capture of the user's foot accomplished by the toe clip also makes it difficult for the user to disengage his foot from the pedal and toe clip. Although this does not present a problem during normal riding, it can present a problem at certain times, such as in a crash situation, or when the user wishes to hold the bike motionless, and use his foot and leg to support the bike in an upright position.

At least one known system exists for providing a selectively releasable mechanism for engaging a person's foot to a pedal to provide the advantages served by the toe clip, while still permitting the user to selectively disengage his foot from the pedal. One example of this known system is the Clipless Pedal System manufactured by Shimano America Corporation of Los Angeles, Calif. This system comprises a special shoe having a clip that is configured to engage a mateable clip that is permanently affixed to the pedal of the bike. The respective clips on the shoe and pedal are configured to be selectively disengageable, to permit the user to disengage the clip on his shoe (and hence his foot) from the clip on the pedal. Although this device is believed to perform its intended function in a workmanlike manner, room for improvement exists. In particular, the Clipless pedal device suffers the drawback of being too expensive to be affordable to a large segment of the casual biking population.

It is therefore one object of the present invention to provide a toe clip having a selective release mechanism that permits the user to disengage his foot from the toe clip. It is also a feature of the present invention to provide such a toe clip that can be produced at a cost less than some, known, currently available pedal engagement devices.

III. SUMMARY OF THE INVENTION

In accordance with the present invention, a releasable toe clip for capturing the user's foot comprises a first strap portion for engaging a dorsal surface of the user's foot. A second strap portion is provided for engaging the medial surface and the lateral surface of the user's foot. A base portion is provided which is placable under the user's foot. A foot releasable coupling means is provided for selectively releasably coupling at least one of the first and second strap portions to the base portion.

Preferably, the foot releasable coupling means comprises a magnetic coupling means which includes a magnet mounting assembly including a base plate, a magnet mounted on the base place, a cover plate mounted on the magnet, and an engagement pin. The magnet means can also include a magnet receiving means that has a generally planar magnet receiving portion having an aperture for receiving the engagement pin, and at least one magnet capturing means for restricting movement of the magnet mounting means assembly on the magnet receiving means.

In accordance with another embodiment of the present invention, a releasable toe clip is provided for placement on a pedal. The toe clip comprises a foot strap member for capturing a user's foot. The strap member includes strap elements for engaging a dorsal surface, a medial surface, and a lateral surface of the user's foot. Coupling means are provided for selectively coupling the foot strap member to the pedal for facilitating the release of the user's foot from its capture by the toe clip. The coupling means includes a bracket member fixedly coupled to the pedal, and a magnet member coupled to the bracket member. A release member is coupled to the foot strap member, and is magnetically coupled to the magnet member. Also provided is at least one of (a) a hinge means for hingedly coupling the release member to the bracket member, and (b) a biasing means for biasing the release member into engagement with the magnet member.

Preferably, the coupling means includes both the hinge means and the biasing means, wherein the hinge comprises a rod disposed within a barrel formed along one edge of the release member, with the ends of the rod being inserted though holes in the bracket member, and the spring comprises a coil spring.

One feature of the present invention is that it comprises a toe clip having a quick release mechanism to partially disengage the toe clip from and pedal. This feature has the advantage of permitting the user to more easily remove his foot from the toe clip, when compared to prior, known toe clips. This feature can be especially useful in emergency, "crash" situations.

A further feature of the present invention is that it includes a magnet assembly means having an engagement pin, and a magnet receiving means having an aperture for receiving the base engagement pin, and at least one magnet capturing means. These features impart several advantages to the present invention. One advantage is that the magnet capturing means helps to restrict the movement of the magnet on the magnet receiving means. This restriction of movement helps to maximize the attraction between the magnet and the magnet receiving means, to help better secure the magnet onto the magnet receiving means. A second advantage is that these features help to better retain the magnet onto the magnet receiving means. The applicant has found that the additional retention provided by these features helps to reduce the occurrences of accidental disengagement of the magnet and the magnet receiving means, while still permitting easy disengagement, when disengagement is so desired.

An additional feature of the present invention is that a hinge and biasing means can be used for hingedly coupling the release member to a magnet member. The hinged coupling permits the release member to move between an "engaged" position wherein the release member engages the magnet member, and a "released" position wherein at least one end of the release member is moved away from the magnet member. When in the released position, the effective length of the strap is sufficiently increased so that the user can disengage his foot from its capture by the toe clip and pedal. The biasing means, such as a spring, biases the release member back into its engaged position to help maintain the release member in its engaged position during use. The hinge connection between the two prevents the release member and the magnet member from becoming completely disengaged. This facilitates reattachment and re-engagement, and obviates the need for the user to use his hands to re-engage the two, which often requires the user to stop the bike.

These and other features of the present invention will become apparent to those skilled in the art upon consideration of the following detailed descriptions of the preferred embodiments exemplifying the best mode of carrying out the invention as perceived presently.

V. DETAILED DESCRIPTION

Figure 1:
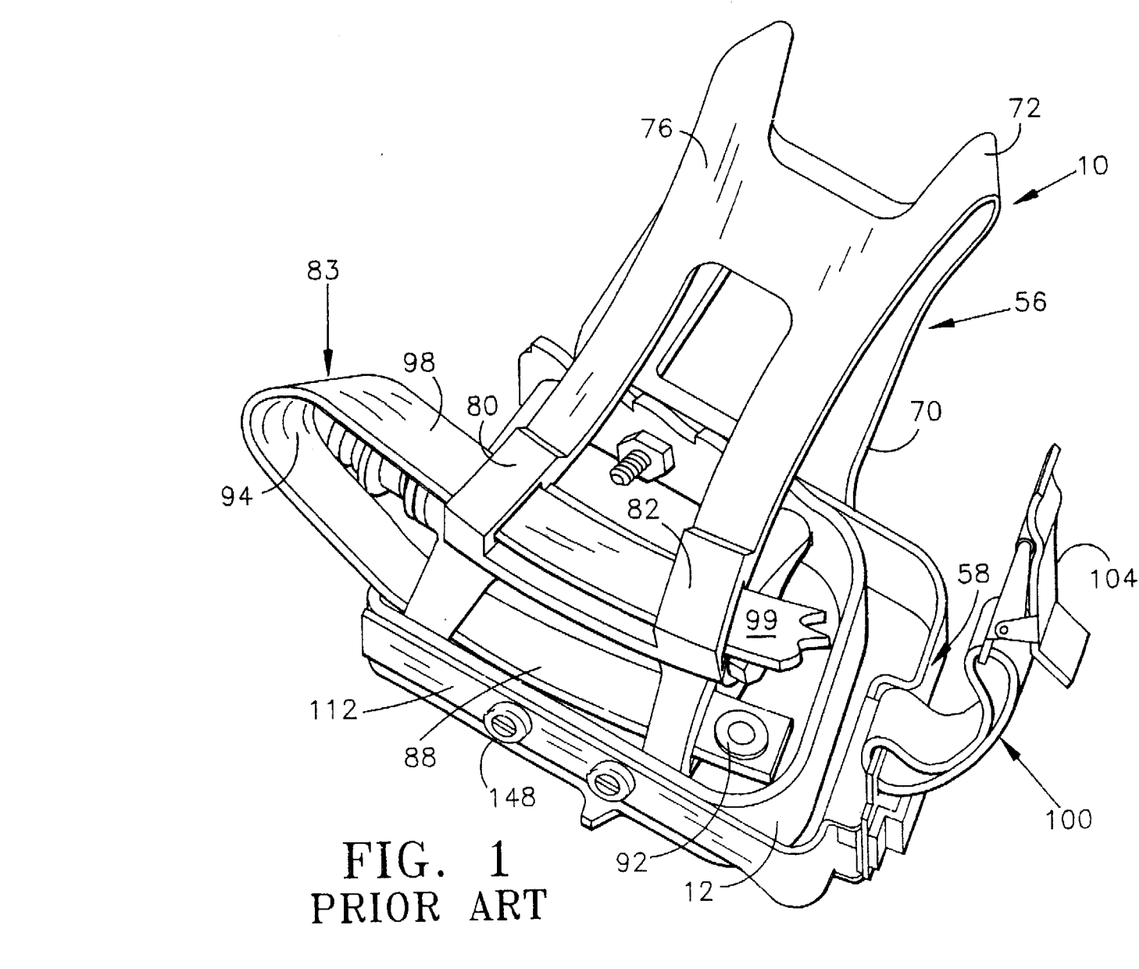
FIG. 1 is a perspective view of the toe clip of the present invention.
Figure 2:
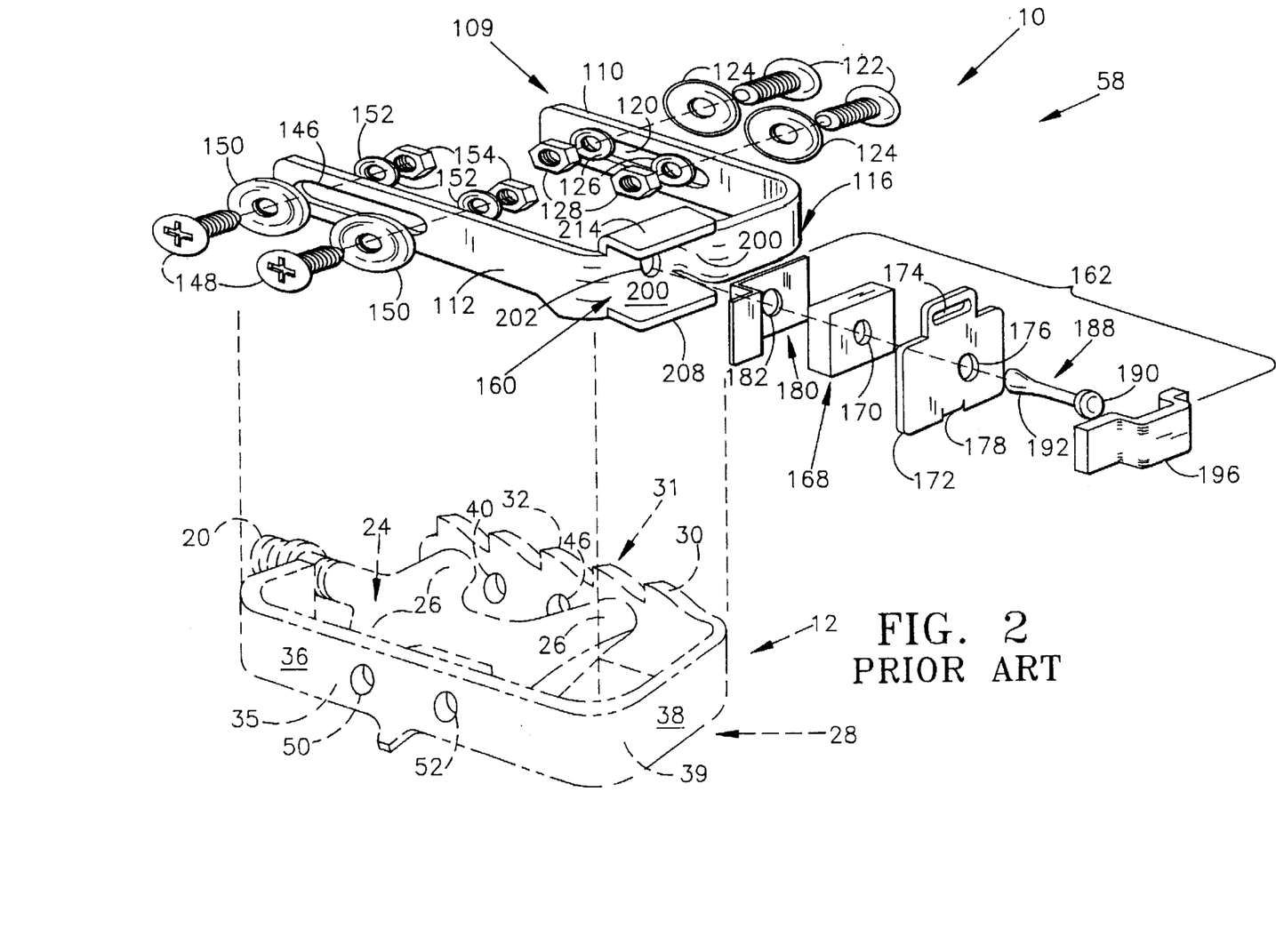
FIG. 2 is an exploded, perspective view of the present invention, with a pedal shown in phantom, and the strap members removed.

A toe clip 10 of the present invention is shown in FIG. 1 as being affixed to a pedal 12 of a vehicle, such as a bicycle. The toe clip 10 is provided for capturing the distal portion of the user's foot, for improving the efficiency of the transmission of rotary force from the user's leg and foot to the pedal 12. The pedal 12 to which the toe clip 10 is attached is best shown in FIG. 2. The pedal 12 includes a threaded base for engaging a crank (not shown) of a bicycle (not shown). The threaded base end 20 engages a female threaded member on the crank. The pedal 12 also includes a trunk 24 that is rotatably mounted to the threaded base 20. The trunk 24 shown in the drawings includes four branches 26 that extend generally normal to the primary direction of extent of the pedal trunk 24.

The branches 26 are formed as a part of the trunk 24, and are provided for coupling the trunk 24 to a perimetral band 28. The combination of the band 28 trunk 24 and branches 26 provide a platform upon which the user can place the planter surface of his foot to exert force against the pedal 12 to move it in a rotary direction. The pedal band 28 includes a foot engaging upper surface 30. As will be appreciated, a pedal 12 that is not equipped with a toe clip 10 contains an upper surface 30 and a lower surface (not shown) that are generally identical, to permit the user to engage either of the two surfaces to apply force to the pedal 12. Even though both the upper and lower surfaces are usable by a rider when a toe clip 10 is attached, the presence of a toe clip 10 tends to cause the user to engage his foot on the upper surface 30, to enable him to take advantage of the benefits obtained by the toe clip 10.

The pedal band 28 also includes a front portion 31 having a front, exterior side surface 32, and a rear portion 35 having a rear, exterior side surface 36. The pedal band 28 further includes a lateral portion 39 having a lateral side surface 38. A pair of apertures 44, 46 are formed in the front portion 30 of the pedal band 28, and a pair of apertures 50, 52 are formed in the rear portion 35 of the pedal band 28. As will be described in more detail below, the apertures 44, 46, 50, 52 are positioned to receive bolts which pass therethrough, for securing the base portion 58 of the toe clip 10 to the pedal 12.

As best shown in FIGS. 1 and 2, the toe clip 10 comprises a strap portion 56, a base portion 58 (FIG. 2) and a magnetic coupling means (FIG. 1). The magnetic coupling means includes a portion coupled to the strap portion 56, and a portion coupled to the base portion 58, for coupling together the strap portion 56 and base portion 58.

Figure 3:
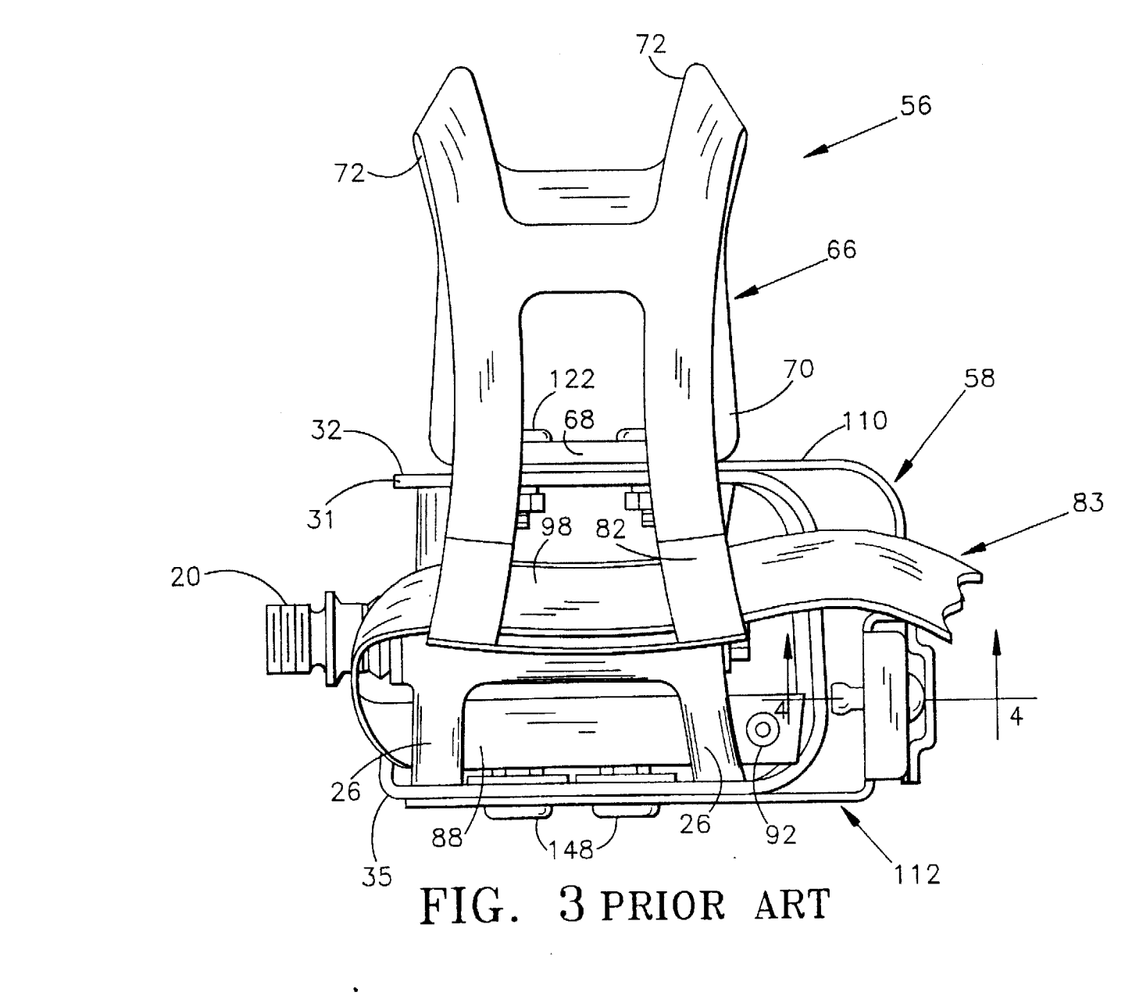
FIG. 3 is a top plan view of the toe clip of the present invention.

As best shown in FIGS. 1 and 3, strap portion 56 includes a first strap element 66 having a pedal connecting section 68 (FIG. 3) that includes a pair of apertures (not shown) through which the pedal connecting section 68 can be coupled to the base portion 58 of the toe clip 10, and the front portion 31 of the band 28 of the pedal 12. The first strap element 66 also includes a planter engaging section 70 that extends forwardly of the pedal 12, and is positioned for engaging the distal, planter surface of the user's foot. The planter surface engaging section 70 includes a right angle bend, which serves as an imaginary line of demarcation between the planter surface engaging section 70 and the toe engaging section 72. The toe engaging section 72 extends generally normal to the planter surface engaging section 70, and parallel to the pedal connecting section 68. The toe engaging section 60 is disposed generally distally from the user's toes. During operation, the toe engaging section 60 helps to permit the user to exert forwardly directed force against it, to help transmit force from his foot to the pedal 12.

The first strap element 66 also includes a dorsal section 76 for engaging the dorsal surface (not shown) of the user's foot. The dorsal section 76 of the first strap element 66 is coupled at one end to the toe engaging section 62, and terminates at its other end in a strap engaging end 78. The strap engaging end 78 includes a pair of loops 80, 82 for receiving the second strap element 83. The second strap element 83 extends generally perpendicular to the first strap element 66, and includes a pedal engaging section 88 that extends through slots formed in the branches 26 of the trunk 24 of the pedal 12. A rivet 92 extends through the pedal engaging section 88, to maintain the second strap element 83 within the lateral slots 90 of the branches 26 of the trunk 24.

The second strap element 83 also includes a medial section 94 which extends along the medial surface of the user's foot, when the user's foot is captured by the toe clip 10. The second strap element 83 also includes a dorsal section at 98 for engaging the dorsal surface of the user's foot. The dorsal surface 98 terminates in a tongue 99. The tongue 99 is engagable with a buckle 104 formed as a part of the lateral section 100 of the toe clip 10. As will be appreciated, the engagement of the tongue 99 and buckle 104 permits the user to properly adjust the size of the toe clip 10 to the user's particular foot size. When in use, the lateral section 100 of the second strap element 83 extends along the lateral surface of the user's foot.

The base portion 58 of the toe clip 10 is best shown in FIG. 2 as including a unitary generally U-shaped metal strap 109. The unitary metal strap 109 includes a first leg 110 that is mounted to the front side surface of 31 of the band 28 of the pedal 12, and a second leg 112 mounted to the rear surface 36 of the rear portion 35 of the band 28. A lateral leg 116 extends between the first leg 110 and the second leg 112, and is disposed adjacent to the lateral surface 38 of the lateral portion 39 of the pedal 12.

An elongated slot 120 is formed in the first leg 110 for receiving a pair of bolts 122. The pair of bolts 122, along with a pair of exterior washers 124, interior washers 126 and nuts 128 are provided for anchoring the first leg 110 (and hence the base portion 58) to the front portion 31 of the pedal 24, by virtue of the passage of the bolts 122 through the slot 120, and through the apertures 40, 46 formed in the front portion 31 of the band 28. The second leg 112 also includes an elongated slot 146 through which bolts 148 can pass. Bolts 148 pass through the elongated slots 146 and through the apertures 50, 52 formed in the rear portion 35 of the band 28 to anchor the second leg 112 (and hence the base portion 58) to the pedal 12. Exterior washers 150, interior washers 152, and nuts 154 are also provided for fixedly coupling the bolts 148 in their respective positions. Preferably nuts 154 and 128 are locking nuts, to help prevent the base portion 58 from becoming disengaged from the band 28 of the pedal 12.

A magnetic coupling means that includes both a magnet receiving means 160 and a magnet mounting assembly 162 are provided for magnetically coupling the strap portion 56 (and more particularly the second strap element 83) to the metal strap 109. This magnetic coupling enables the connection between the second strap element 83 and metal strap 109 to be selectively releasable by the user's foot, in a "quick release" manner to enable the user to disengage his foot from the toe clip when riding the bicycle or other vehicle to which the toe clip 12 is attached.

As will be appreciated, the time required to uncouple the coupling is largely dependent upon whether the coupling can be uncoupled through action of the user's foot alone. Although a hand-activated buckle-like clip could be released, the time frame in which it could be uncoupled would likely be too slow to provide any significant help to a rider to disengage his foot from a pedal in an emergency "crash" type situation. Preferably, the magnetic coupling means has sufficient magnetic strength to remain coupled when the user is applying rotary peddling forces to the toe clip, but to release quickly upon the application of a lateral force to the toe clip. The configuration of the magnetic coupling means, and the strength of the magnet are chosen so as to achieve this desirable feature.

The magnet mounting assembly 162 includes a rectangular cuboid shaped permanent magnet 168. Preferably magnet 168 is a ceramic type magnet, of the type commonly available from a variety of sources. An aperture 170 extends through the magnet. A base plate 172 is positioned exteriorly of the magnet 168, and includes a slot 174 to which an end of the lateral portion 100 of the second strap element 83 is attached. The base plate 172 also includes a central aperture 176 that can be aligned with the aperture 170 in the magnet 168. The base plate further includes a hook shaped tongue member 178 (FIG. 4) that extends out of the major plane of the base member 172. A flange containing cover plate 180 is disposed relatively interiorly of the magnet 168 and includes a central aperture 182 that is alignable with the apertures 170, 178 of the magnet 168 and base plate 172, respectively. Those familiar with ceramic magnets recognize that the material from which a ceramic magnet is made is generally is somewhat soft and friable. The cover member 180, and base member 172 that are placed over the magnet 168 help to prevent either the magnet being degraded, or portions of the magnet being chipped away. Thus, the use of the cover plates 172, 180 helps to lengthen the useful life of the magnet 168, and hence the toe clip 12 to which it is attached.

An engagement pin 188 includes an enlarged head 190, and an enlarged, somewhat bulbus distal end 192. The engagement pin 188 extends through the apertures 176, 170, 182 of the base plate 172, magnet 168, and cover plate 180, respectively. The engagement pin 188 serves two primary functions. The first is to join together and fixedly couple together the base plate 172, magnet 168 and cover plate 182. The second function is to become engaged with the aperture 202 formed in the planar portion 200 of the magnetic receiving portion 160, to restrict movement of the magnetic mounting assembly 162 on the magnet receiving means 160.

An exterior cover member 196 is welded, or otherwise fixedly attached to the exterior surface of the base plate 172, to help prevent the head 190 of the pin 188 from becoming sheared off or otherwise damaged if the toe clip 10 were to impact a hard surface such as in a crash situation.

The magnet receiving means 160 includes a generally planar magnet receiving portion 200 having an aperture 202 formed therein. When the magnet receiving means 160 is magnetically coupled to the magnetic mounting assembly 162, the aperture 202 in the magnet receiving portion 200 will align with the apertures 182, 170, 176 of the cover plate 182, magnet 168 and base plate 172, respectively, to permit the bulbus distal end 192 of the engagement pin 188 to be received within the aperture 202. The magnet receiving means 160 also includes a magnet capturing means which helps to restrict the movement of the magnet assembly 162 on the magnet receiving means 160 when the two are engaged.

Figure 4:
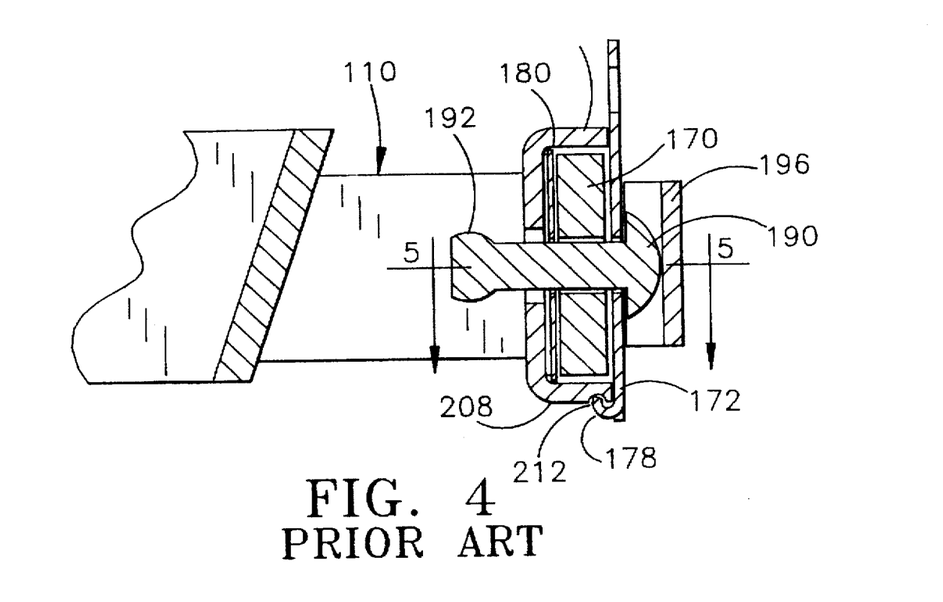
FIG. 4 is an enlarged sectional view taken along lines 4—4 of FIG. 3.
Figure 5:
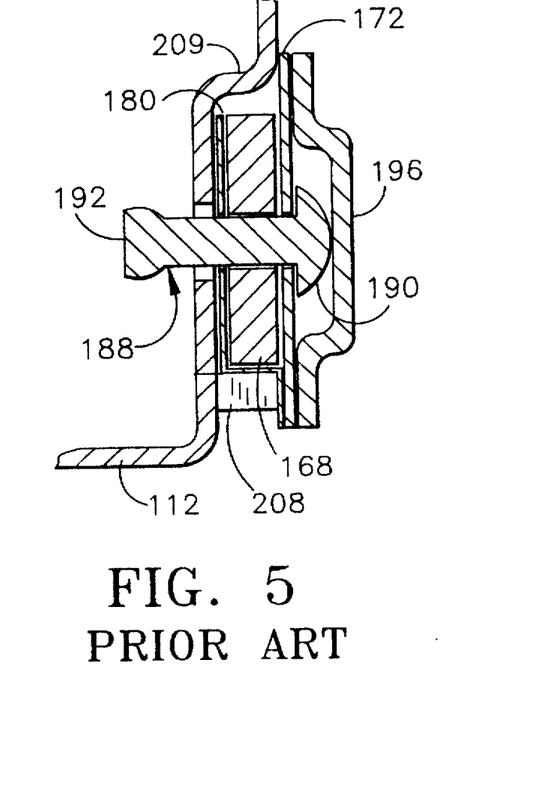
FIG. 5 is an enlarged sectional view taken along lines 5—5 of FIG. 4.

Along with aperture 202, the magnet capturing means includes a first flange 208 which is disposed adjacent to the first side of the planar receiving portion 200. As best shown in FIG. 4, the first flange 208 includes a recessed groove 212, formed in its lower surface. The groove 212 is provided for receiving the tongue 178 of the base plate 172, to better anchor together the base plate (and hence the magnet mounting assembly 162) to the first flange 208 (and hence the magnet receiving means 160). The magnet capturing means also includes a second flange 214 disposed adjacent to a second side of the planar portion 200 of the magnet receiving means, and disposed generally perpendicular thereto; and a third flange 209 disposed adjacent to a third side of the planar magnet receiving portion 200.

It will be appreciated from a review of the configuration of the device 10, that the configuration and positioning of the magnet capturing means and the magnet mounting assembly 162 help to supplement attractive the force of the magnet 168, by mechanically capturing the mounting assembly 162 onto the magnet receiving means 160. The first flange 208 and the second flange 214 generally help to prevent the magnet mounting assembly 162 from becoming disengaged from the magnet receiving means 160 upon the exertion of either upwardly or downwardly directed force on the second strap element 83 by the user. The third flange 209 helps to maintain the magnet mounting assembly 162 in a proper position on the magnet receiving means upon the exertion of a forwardly directed force by the user.

This configuration generally only permits disengagement through the application of a laterally directed force that is exerted by the lateral side of the user's foot against the lateral section 100 of the second strap element 83. An exertion of this lateral force will cause the magnet mounting assembly 162 to become disengaged from the magnet receiving means 160. When so disengaged, the user can remove his foot from the interior of the toe clip 12, to overcome the toe clip's capture of the user's foot.

It will also be appreciated that the parts of the embodiment described above can be reversed, so that the magnet mounting assembly can be attached to the pedal, and the magnet receiving means be attached to the toe clip (not shown). In such case, the magnet mounting assembly would include a magnet, a tongue member, a flange-containing cover plate and a bulbous-tailed engagement pin that would be attached to the pedal, through their connection with the strap. The magnet receiving means would include a planar magnet receiving portion, a first flange, a second flange, and an exterior cover member, which would be attached to the toe clip through the coupling of a strap of the toe clip to a slotted aperture.

Another embodiment of the present invention is shown in FIGS. 6–9. This embodiment includes a toe clip 400 having a foot strap member 402 which is coupled to a pedal, such as bicycle pedal 404. A coupling means 408 is provided for selectively coupling the foot strap member 402 to the pedal 404 for facilitating the release of the user's foot from its capture by the toe clip strap member 402 and pedal 404.

Figures 6, 7, 8, 9:
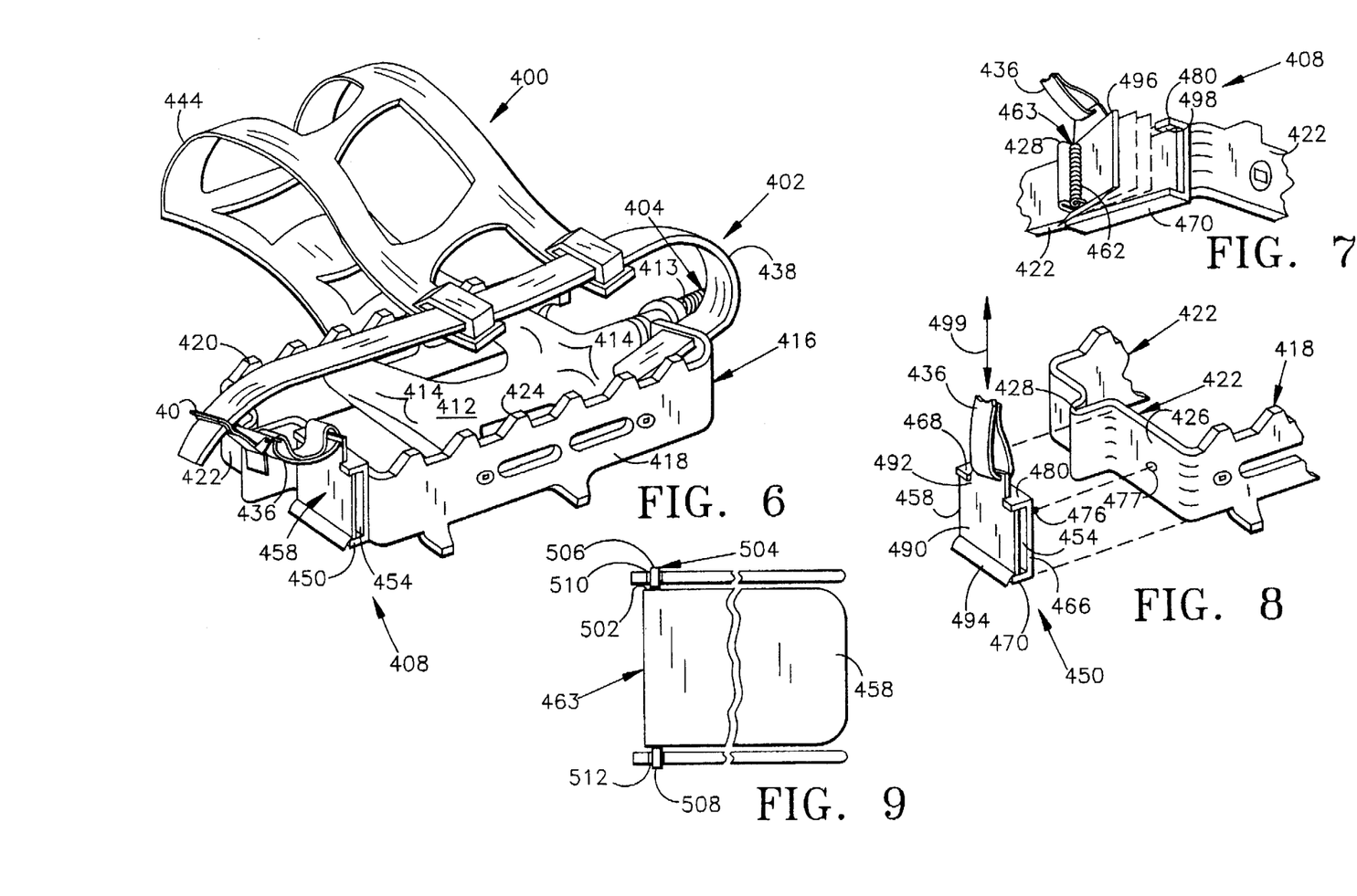
FIG. 6 is a perspective view of an alternate embodiment of the present invention.
FIG. 7 is a fragmentary, perspective view of the coupling member of the present invention.
FIG. 8 is a fragmentary, partially exploded view of the coupling member and the pedal of the present invention.
FIG. 9 is a fragmentary side view of the spring and hinge of the release member.

The pedal 404 is preferably a standard pedal of a type found currently on many bicycles, and includes a trunk portion 412 that is rotatably coupled to a threaded end 413, which is threadedly coupled to a pedal crank of a bicycle (not shown). Four, generally co-planar branches 414 extend outwardly from the trunk portion 412 to engage the trunk portion 412 to a perimetral band 416 of the pedal 404. The perimetral band 416 is generally made from a stamped and formed steel ribbon-like member, and includes a first leg 418 that is coupled to a first pair of the branches 414, a second leg 420 that is coupled to a second pair of the branches 414, and a side leg 422. The side leg 422 of the perimetral band 416 is generally disposed relatively "outbound" in relation to the first and second legs 418, 420, when the pedal 404 is assembled onto a bicycle. As shown in the drawing, the perimetral band 416 and in particular, the first and second legs 418, 420 thereof, include a edge surface 424 for engaging the plantar surface of the user's foot.

The toe clip 400 includes a foot strap member 402 comprising a plurality of foot strap elements. The foot strap elements include a first strap element 436, a second strap element 438, and a buckle member 440. The first and second strap elements 436, 438 and buckle member 440, are disposed generally co-linearly, and are provided for engaging the user's foot. The buckle member 440 joins together the first strap element 436 and second strap element 438, and permits the user to adjust the collective length of the combined first and second strap elements 436, 438, to enable the user to accommodate feet of different sizes. The first strap element 436 generally engages the lateral surface of the user's foot, and the second strap element 438 engages the dorsal surface and medial surfaces of the user's foot. At one of their ends, each first and second strap elements 436, 438 are joined to each other through the buckle member 440. At its other end, the first strap element 436 is joined to the coupling means 408. The opposite end of the second strap element 438 is coupled to pedal 404.

The strap member 402 also includes a U-shaped third strap element 444. The ends of each of the legs of the "U" are coupled to the second strap element 438, and the base of the "U" is coupled to the pedal 404. Preferably, the base of the third strap element 444 is coupled to the perimetral band 416, at the second leg 420. The third strap element 444 is provided for capturing the dorsal surface of the user's foot, the front of the user's foot, and the forward portion of the plantar surface of the user's foot. The foot strap elements 436 shown in FIG. 6 are generally similar to the corresponding foot strap elements of the embodiment shown in FIG. 1 and described above, and serve a generally similar purpose.

The coupling means 408 includes a bracket member 450 that is fixedly coupled to the perimetral band 416 of the pedal 404, a magnet member 454 that is fixedly coupled to the bracket member 450. The coupling means 408 also includes a release member 458 that is coupled to the first strap element 436 of the foot strap 402; is hingedly coupled to bracket member 450; and is magnetically coupled to the magnet member 454. A spring 462 and hinge member 463 is provided for hingedly coupling the release member 458 to the bracket member 450, and for biasing the release member 458 into engagement with the magnet member 454. The bracket member 450 includes a generally planar magnet receiving portion 466, a first flange 468 disposed on one side of the magnet receiving portion 466, and a second flange 470 disposed at an opposite, second side edge of the magnet receiving portion 466. The first and second flanges 468, 470 are generally disposed in parallel planes, each of which is generally perpendicular to the plane of the magnet receiving portion 466. The magnet receiving portion 466 includes an aperture (not shown) disposed generally at its center, through which a bolt 476 can pass. Bolt 476 is sized and positioned for being received in an aperture 477 that is formed in the coupler receiving portion 426 of the side leg 422 of the perimetral band 416. A locking nut (not shown) can be provided for engaging the bolt 476 to secure the bolt 476, and hence the coupling means 408 onto the side leg 422. When the bolt 476 extends through aperture 477, the outer surface of the planar receiving portion 466 of the bracket 450 fits flush up against the outer surface of the coupler receiving portion 426 of the side leg 422, to nest the coupling means 408 adjacent to the guard member 428. As best shown in FIG. 7, when the device is assembled, the guard member 428 extends outwardly further than the coupler 408 so that the guard 428 engages the pavement before the coupler 408, if the bicycle falls on its side and the pedal 404 strikes the ground.

The first flange 468 includes a relatively further-outwardly protruding ear portion 480 for engaging an edge of the release member 458, as will be described in more detail below. As will also be discussed below, the ear portion 480 serves as a release member capturing means, for helping to capture the release member 458.

The magnet member 454 is preferably a rectangular-cuboid shaped magnet member 454, and is sized to fit on the magnet receiving portion 466, between the first and second flanges 468, 470. The magnet member 454 is fixedly coupled to the bracket member 450. One way to achieve this fixed coupling is to pass the bolt 476 through the both the bracket member 450 and the magnet 454. Because of the softness of many magnets, it is desirable, when passing a bolt through the magnet 454, to use a washer to spread the stress induced by bolt 476 over a larger surface area of the magnet 454. In a preferred embodiment, the washer is a thin, metal member, having a size and shape generally similar to the surface of the magnet 454, so that the washer covers the entire surface of the magnet 454, and hence serve as a guard for the magnet 454, in a manner similar to that served by base plate 172 and cover plate 180, shown in FIG. 2.

The release member 458 includes a central, magnet engaging portion 490 which is generally planar, rectangular and sized and dimensioned similar to the magnet member 454. The release member 458, and its magnet engaging portion 490 in particular, are made of a magnetizable material, such as steel, which is capable of being attracted by a magnet and being retained on a magnet through magnetic force. The release member 458 also includes a strap receiving portion 492 that is disposed along one edge of the magnet engaging portion 490. The strap receiving portion 492 includes an angled slot 491 for receiving the first strap element 436 for coupling the release member 458 and hence the coupling means 408 to the foot straps 402 of the toe clip 400. It will be noted that the slot 491 is angled slightly to conform with the appropriate orientation and proper placement and direction of the extent of the first strap element 436.

The upper edge 496 (FIG. 7) of the magnet engaging portion 490 of the release member 458 is sized and positioned for being received, and captured by the underside surface 498 of the ear portion 480, when the release member 458 is in engaged with the magnet 454. This engagement between the upper edge 496 and the underside surface 498 of the ear 480 helps to maintain the release member 458 in engagement with the magnet member 454 during the use of the device. When the user applies rotary force onto the pedal 404 and toe clip 400, such as when the user is rotating the pedal crank by pedaling the bicycle, the rotary force applied by the user will tend to be exerted in a direction generally perpendicular to the line of intersection between the upper edge 496 and the underside surface 498, causing the release member 458 to be pulled in a direction indicated generally by arrow 499. Without the engagement between the ear 480 and upper surface 496, the release member 488 would likely be pulled on its hinge, resulting in the release member 488 either becoming disengaged from the magnet 454, or alternately, placing undue stress on the hinge member 462.

Release member 458 also includes a lower guard portion flange member 494, that extends in the plane generally oblique to the plane 490 of the magnet engaging portion 490. The guard portion 494 extends outwardly to help protect the integrity of the coupling member 402 in a crash situation wherein the coupling member 402 would engage the pavement.

A hinge means 462 is provided for hingedly coupling the release member 458 to the bracket member 466, so that the release member 458, and in particular the magnet receiving portion 490, can hingedly move between an "engaged" position wherein the release portion 458 is engaged and magnetically coupled to the magnet 454; and a "released" position. In the released position, the magnet engaging portion 490 of the release member 458 is moved away from the magnet 454, and is out of magnetic engagement with the magnet 454. This pivotal movement of the release member 458 fractionally increases the effective length of the strap member 436 to "loosen" the toe clip 400, thus facilitating removal of the user's foot from the toe clip. The release member 458 is shown in its engaged position in each of FIGS. 6 and 8, and in its release position in FIG. 7. The biasing means, here shown as spring 462 biases the release member 458 into engagement with the magnet portion 454, so that normally, the release member 458 is biased into its engaged position, as shown in FIG. 8. However, the user can exert a laterally outwardly directed force against the first strap element 436 of the toe clip to move the release member 458 pivotally outwardly, as shown in FIG. 7.

Through the user's application of this laterally directed force, the user can loosen the toe clip, and thereby better remove his foot from the pedal 404 and toe clip 400. This lateral force can be exerted to cause the release member 458 to move into its release position rather quickly, to permit the user to release his foot from the toe clip in an emergency type situation.

Once so released, the biasing force exerted by the spring will cause the release member 458 to become re-engaged with the magnet on its own, without any need for the user to use his hands to re-engage the release plate 458 to the bracket 466. Thus, if the user disengages his foot completely from the toe clip, he can reinsert his foot into the toe clip, temporarily disengage the release member 458 from the magnet to loosen the toe clip 402, so that he can fully insert his foot, and then move his foot in the proper position on the pedal 404 to allow the release member 458 to become re-engaged to the magnet 454. All of this can be done without the need for the user to use his hands to re-engage the release 458 and the magnet 454 and bracket 476. This feature is especially helpful if the user disengages his foot during a time when the bike has not come to a full stop, as the user can re-engage his foot to the toe clip without ever stopping the bike.

As best shown in FIG. 9, the hinge means includes a barrel 502 formed as a portion of the release member. The barrel 502 extends generally between the upper edge 496 and guard portion 494 of the release member 458, and has a diameter sized for receiving the hinge pin 504. Hinge pin 504 is placed in the barrel 502, and has a length greater than the barrel, so that the first end 506 and second end 508 of the hinge pin 504 extend out of the barrel 502 and through respective first 510 and second 512 apertures formed respectively in the first flange member 468 and second flange member 470 of the bracket 466.

Preferably, hinge pin 504 is a spring-loaded, telescoping hinge pin 504 having a length that can be reduced to facilitate the engagement of the ends 506, 508 of the hinge pin 504 in the apertures 510, 512, by squeezing together the ends 506, 508 of the hinge pin 504. When the ends 506, 508 are released, the spring (not shown) within the hinge pin 504 will urge the ends 506, 508 outwardly to increase the effective length of the hinge pin 504, and to securely engage the ends 506, 508 in the apertures 510, 512.

Figure 10:
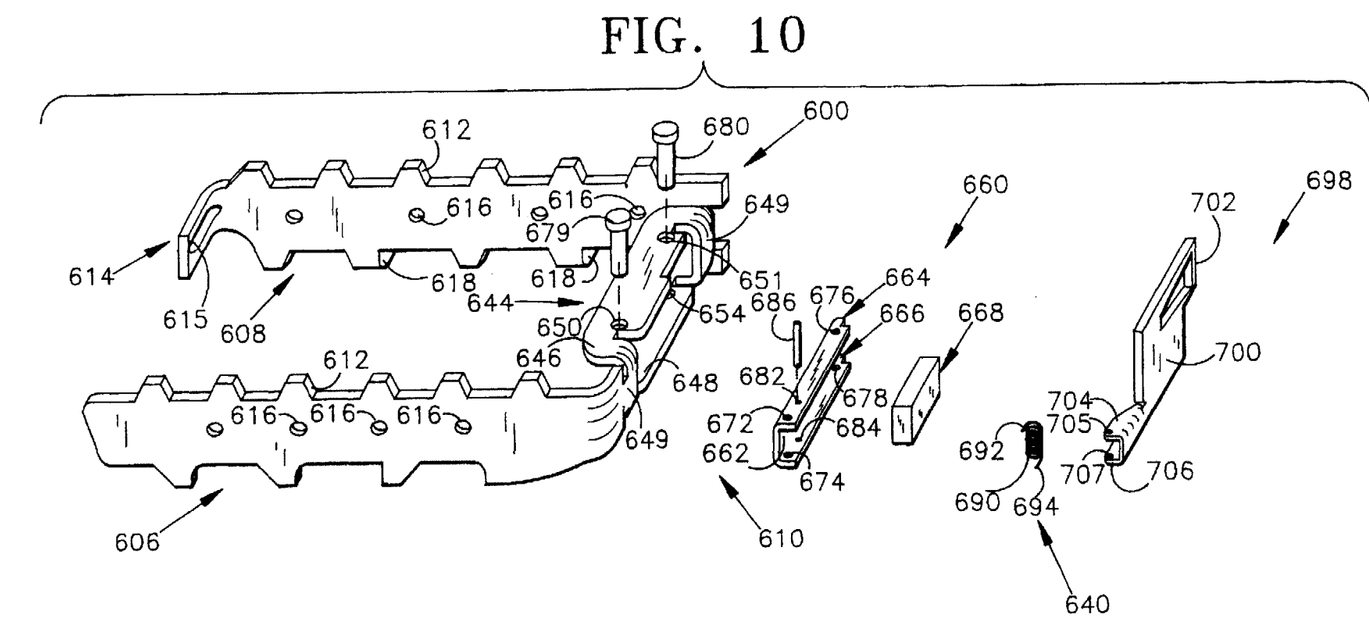
FIG. 10 is an exploded view of a third embodiment of the present invention (shown without the pedal toe and strap portion)
Figure 11:
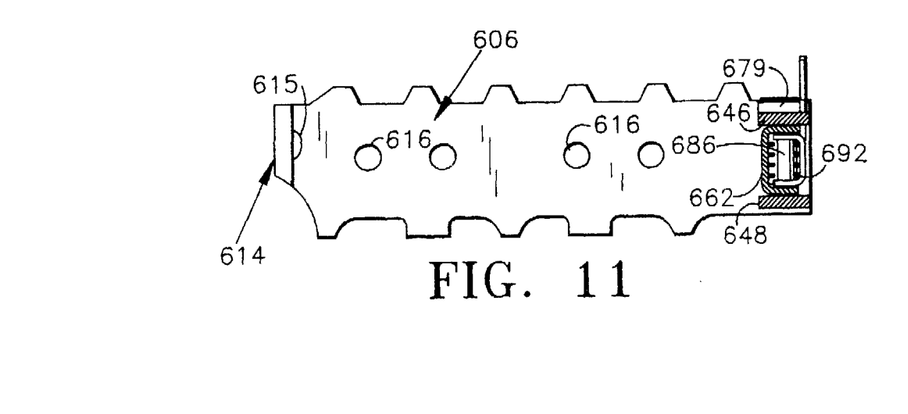
FIG. 11 is plan view, partly in section, of the pedal of the embodiment of the invention of FIG. 10.
Figure 12:
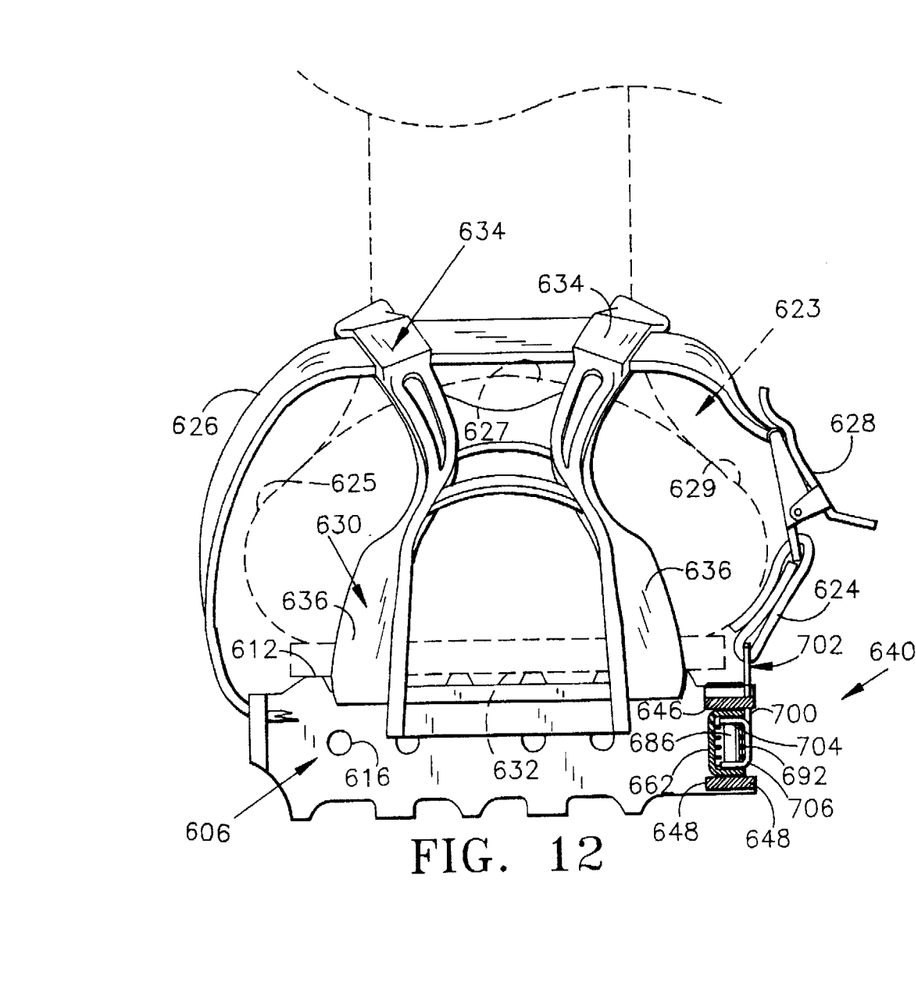
FIG. 12 is a front view of a left hand side pedal and toe clip of the embodiment of the invention of FIG. 10.
Figure 13:
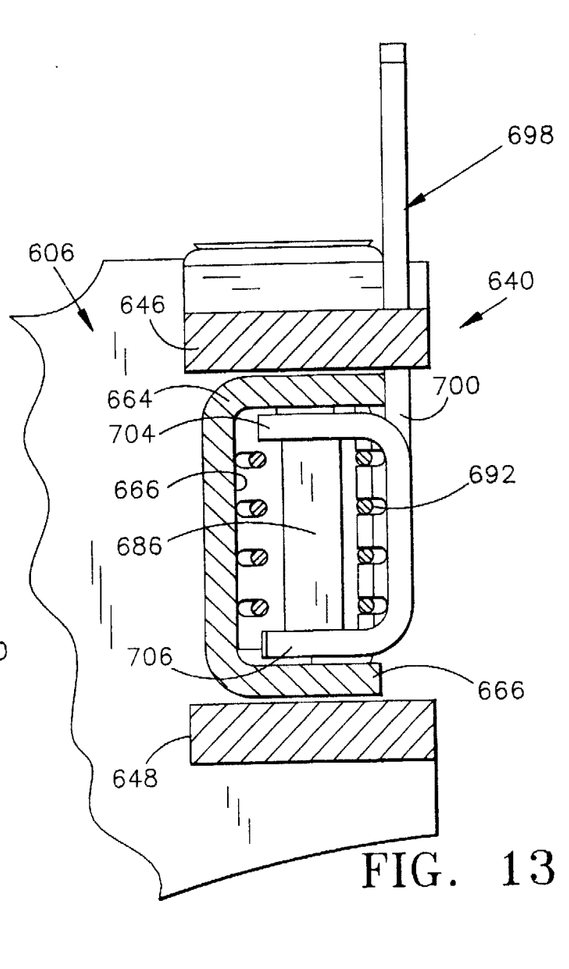
FIG. 13 is an enlarged plan view, partly in section of the invention of FIG. 10.

A third embodiment pedal and toe clip combination is shown in FIGS. 10–13. Turning now to FIGS. 10 and 12, a pedal 600 is shown that includes a trunk portion (not shown) which is generally similar to the trunk portion 412 shown in FIG. 6. The pedal 600 includes a perimetral band 604 that includes a first leg 606, a second leg, 608, a first side (lateral) leg, 610 and a partial, second side (lateral) leg 614. A first and second legs 606, 608 are disposed in generally parallel planes. The first side leg 610 and partial, second side leg 614 are disposed in planes that are generally parallel to each other, but perpendicular to the first and second legs 606, 608. The perimetral band 604 includes an edge surface 412 which here is shown as a somewhat serrated edge surface 612, for engaging the plantar surface of the user's foot in a gripping manner. Unlike the first side leg 610, the partial second side leg 614 does not extend all the way between the first and second legs 606, 608. The partial second leg 614 includes a slot 615 for receiving one of the strap elements of the strap member of the toe clip.

Each of the first and second legs 606, 608 includes a plurality of apertures 616 through which bolts can pass for attaching the trunk portion (not shown) to the first and second legs 606, 608. Additionally, the slots 616 can be provided for receiving bolts for attaching the base 636 (FIG. 12) of the strap member. The second leg 608 can include a pair of righting flanges 618 which are provided for helping to enable the user to rotate the perimetral band 604 into a proper orientation so that he may place his foot into the toe clip.

The perimetral band is shown being connected to a foot strap member 622 of the toe clip in FIG. 12. The foot strap member 622 is shown in FIG. 12 as capturing a foot, shown in FIG. 12 as a left foot 623. The foot strap member 622 includes a first strap element 624 a second strap element 626 and a third strap element 630. The function and configuration of the first, second and third strap elements 624, 626, 630 are generally similar to the first, second and third strap elements 436, 438, 444 of the embodiment shown in FIG. 6. A buckle, represented schematically at 628 is provided for adjustably coupling the first strap element 624 to the second strap element 626. Buckle 628 can be identical to buckle 104 of FIG. 1. The first strap element 624 is provided for engaging the lateral surface 629 of the foot. The second strap element 626 is provided for engaging the medial surface 625 and the dorsal surface 627 of the foot.

The third strap element 630 is generally 'U' shaped, and is provided for engaging the distal portion of the planter surface 432 and dorsal surface 627 of the user's foot. The middle portion of the planter surface 432 of the user's foot engages the upper edge 612 of the perimetral band 604, although the heel portion usually engages no part of the pedal. Loops 634 are provided for receiving the second strap element 626 therein. The base 636 of the 'U' shaped element 630 is coupled such as by bolts (not shown) to the first leg 606 of the perimetral band 604.

A coupling means 640 for selectively releasably coupling the foot strap member 622 to the perimetral band 604 is best shown in an exploded view in FIG. 11. The coupling means 640 includes a base member 644 which is formed as a part of the first side leg 610. The base member 644 includes a top base element 646 and a bottom base element 648. Both of the top base element 646 and bottom base element 648 are disposed in generally parallel planes that are disposed generally perpendicular to the plane in which the first side leg 610 generally extends. A pair of vertical base elements 649 extend between and connect the top and bottom base elements 646, 648.

The top base element 646 includes a pair of apertures including a first aperture 650 and a second aperture 651. The bottom base element 648 also includes a first aperture (not shown) which is aligned with the first aperture 650 of the top base element 646 and a second aperture 654 which is aligned with the second aperture 651 of the top base element 646. The coupling means 646 also includes a bracket member 660 which is fixedly attached to the top and bottom base elements 646, 648 through the passage of a third fastener member 679 through the first aperture 650 of the top base element 646 and the first aperture (not shown) of the bottom base element 648; and a second fastener member 680 which extends through the second apertures 651, 654, of the top and bottom base elements 646, 648 respectively.

The bracket member 660 includes a magnet receiving portion 662 which is disposed in a plane generally perpendicular to the planes of the top and bottom base elements 646, 648. The bracket member 66 also includes a first flange 664 disposed on one side of the magnet receiving portion 662, and a second flange 666 disposed on a second side of the magnet receiving portion 662. The first and second flanges 664, 666 are disposed in a plane generally perpendicular to the plane of the magnet receiving portion 662, and in planes that are generally parallel with the planes in which the top and bottom base elements 646, 648 extend. A permanent magnet 668 is fixedly attached, such as by glue, polymethylmethacrylate or other adhesive to the magnet receiving portion 662. Each of the first and second flanges 664, 666 includes a plurality of apertures.

The first flange 664 includes a first aperture 672, a second aperture 676, and a third aperture 682. The second flange includes a first aperture 674, which aligned with the first aperture 672 of the first flange 664; a second aperture 678, which is aligned with the second aperture 676 of the first flange 664, and a third aperture 684, which is aligned with the third aperture 682 of the first flange 664. The first fastener member 679 extends through first apertures 650, 672, 674, (not shown) to fasten together the bracket member 660 and the base member 644. The second fastener member 680 extends through second aperture 651, 676, 678 and 654 to also fasten the bracket 660 to the base member 644. A hinge pin 686 passes through the third 682, 684 of the bracket member 660. The hinge pin 686 defines an axis about which the release member 700 can pivot which is generally tangential to the direction of rotation of the pedal 600 about the axis of the pedal crank (not shown). During assembly, a coil spring 690 having a first end 692 and a second end 694 is placed between the third apertures 682, 684 for interiorly receiving the hinge pin 686. The first end 692 of the spring 690 is placeable against the magnet receiving portion 662 of the bracket member 660, and the second end 694 is placeable against the release member 698.

The hinge pin 686 also extends through a pair of apertures 705, 707 that are formed on first and second ears 704, 706 of the release member 698. When the hinge pin 686 passes through the third apertures 682, 684 of the bracket member 660, and the apertures 705, 707 of the first and second ears 704, 706, the hinge pin 686 serves to hingedly connect the release member 698 to the bracket member 660. Because the hinge pin 686 also fixedly couples the biasing means (spring 690) to the bracket member 660, and because of the engagement of the first and second ends, 692, 694 of the spring of the bracket member 660 and release member 698, the hinged coupling that is formed between the bracket member 660 and the release member 698 is one wherein the release member 698 is biased by spring 690 into engagement with magnet 668. As illustrated in FIG. 12, the spring 690 biases the release member to pivot about hinge pins 698 in a generally counter-clockwise direction.

Release member 698 includes a generally planar portion 700 for magnetically attaching to magnet 668. In this regard, release member 698 should be made of a magnetizable material to be attracted to the magnet 668. A slot 702 is formed at the upper end of the planar portion 700 to engage the end of the first strap element 624 (FIG. 12).

Although the device shown in FIG. 10 includes both a magnet 668 and spring 690 for biasing the release member 689 into engagement with the bracket member 660, it will be appreciated that a sufficiently strong spring 690 may be useable alone, to thereby obviate the need for magnet 668.

The toe clip shown in FIGS. 10–13 functions generally similarly to the toe clip shown in FIG. 6. During normal operation, the spring 690 biases the release member 700 into engagement with bracket 660. The magnet 668 helps to maintain the release member in its engagement with the bracket member 660. When the user wishes to either insert or remove her foot 623 from the toe clip, the user employs the lateral portion of her foot to push outwardly against the first strap element 624, to thereby move the release member 700 out of engagement with the magnet 668 and bracket 660. This causes the toe clip opening to be effectively enlarged, thus enabling the user to insert or remove her foot easily from its engagement with the perimetral band 604 of the pedal. When the user's foot is placed properly on the pedal, the spring 690 will bias the release member 700 back into engagement with the bracket member 660.

It will also be noticed that the ears 704, 706 of the release member 698 are formed to be generally parallel with the first and second flanges 664, 666 of the bracket member 660 and sized to be received interiorly of the first and second flanges 664, 666. This reception of the ears 704, 706 by the first and second flanges 664, 666 helps to maintain the engagement of the release plate 700 with the bracket member 660 and magnet 668 by helping to maintain proper alignment of the release member 698 on the hinge pin 686.

Although the invention has been described in detail with reference to the illustrated preferred embodiment, variations and modifications exist within the scope and spirit of the invention as described, and as defined in the following claims.

What is claimed is:

1. A toe clip and pedal for facilitating disengagement of a user's foot, the toe clip comprising:
   (a) a foot strap member for capturing a user's foot, the strap member including strap elements for engaging surfaces of the user's foot;
   (b) coupling means for selectively coupling the foot strap member to the pedal for facilitating the release of the user's foot from its capture by the toe clip, the coupling means including:
      (1) a bracket member coupled to the pedal;
      (2) a release member coupled to the foot strap member; and
      (3) at least one of (i) a hinge means for hingedly coupling the release member to the bracket member; and (ii) a biasing means for biasing the release member into engagement with the bracket member.

2. The toe clip of claim 1 wherein the coupling means includes both the hinge means and the biasing means.

3. The toe clip of claim 1 wherein the bracket member includes a receiving portion, and the release member includes capturing means for restricting movement of the release member on the bracket member.

4. The toe clip of claim 3 wherein the capturing means includes an ear member for restricting movement of the release member in a direction in which rotary force is applied to the pedal.

5. The toe clip of claim 4 where the ear member includes first and second ear members and the bracket member includes a first flange disposed on a first side of the receiving portion, and a second flange disposed on a second side of the receiving portion for receiving the ear member.

6. The toe clip of claim 1 wherein the bracket member includes fastening means for detachably fastening the bracket member to the pedal.

7. The toe clip of claim 6 wherein in the bracket member includes an aperture, and the fastening means includes a bolt member insertable through each of the bracket member and pedal for detachably fastening the bracket member to the pedal.

8. The toe clip of claim 1 wherein the release member comprises a release plate member including a slot for receiving the first strap member, and a hinge receiving portion for receiving the hinge means.

9. The toe clip of claim 8 wherein coupling means includes both the biasing means and the hinge means, the hinge means includes a rod member attachable to the bracket member, and a pair of ear members on the release member sized and positioned for hingedly receiving the rod member, and the biasing means comprises a spring member coupled to the bracket member and release member for urging the release member to pivot about the rod member toward a position of engagement with the bracket member.

10. The toe clip of claim 1 wherein the release member comprises a generally planar release plate having a slot for receiving the first strap member, and a pair of ear members, each having an aligned aperture for receiving the hinge means, and the bracket member includes a receiving portion for receiving the release member.

11. A toe clip containing pedal comprising:
(I) a pedal having a first leg, a second leg disposed generally parallel to the first leg, and a lateral leg disposed between, and generally perpendicular to the first and second legs, and
(II) a toe clip comprising
  (a) a first strap member for capturing a user's foot, the strap member including strap elements for engaging surfaces of the user's foot
  (b) coupling means for selectively coupling the foot strap member to the pedal for facilitating release of the user's foot from its capture by the toe clip, the coupling means including
    (1) a bracket member disposed on the lateral leg of the pedal,
    (2) a release member coupled to the foot strap member,
    (3) hinge means for hingedly coupling the release member to the bracket member, the hinge means including a rod member attachable to the bracket member,
    (4) a hinge receiving portion on the release member sized and positioned for hingedly receiving the rod member, and
    (5) biasing means for biasing the release member into engagement with the bracket member, the biasing means comprising a spring member coupled to the bracket member and release member for biasing the release member to pivot about the rod member toward the bracket member.

12. A toe clip containing pedal comprising:
(I) a pedal having a first leg, a second leg disposed generally parallel to the first leg, and a lateral leg disposed between, and generally perpendicular to the first and second legs, and
(II) a toe clip comprising
  (a) a first strap member for capturing a user's foot, the strap member including strap elements for engaging surfaces of the user's foot
  (b) coupling means for selectively coupling the foot strap member to the pedal for facilitating release of the user's foot from its capture by the toe clip, the coupling means including
    (1) a bracket member disposed on the lateral leg of the pedal,
    (2) a release member coupled to the foot strap member,
    (3) hinge means for hingedly coupling the release member to the bracket member, and
    (4) biasing means for biasing the release member into engagement with the bracket member, wherein the bracket member includes a generally planar receiving portion, a first flange disposed on a first side of the receiving portion, the first flange including a release member capturing means for restricting movement of the release member, the release member including a generally planar portion having an edge surface for engaging the release member capturing means, and a hinge receiving portion for receiving the hinge means.

13. A toe clip for placement on a pedal having a first leg, a second leg disposed generally parallel to the first leg, and a lateral leg disposed between, and generally perpendicular to the first and second legs, the toe clip comprising
  (a) a first strap member for capturing a user's foot, the strap member including strap elements for engaging surfaces of the user's foot
  (b) coupling means for selectively coupling the foot strap member to the pedal for facilitating release of the user's foot from its capture by the toe clip, the coupling means including
    (1) a bracket member disposed on the lateral leg of the pedal,
    (2) a release member coupled to the foot strap member,
    (3) hinge means for hingedly coupling the release member to the bracket member, for permitting the release member to hingedly pivot between a released position and an engaged position, and
    (4) biasing means for biasing the release member into the engaged position in engagement with the bracket member, wherein the release member and strap member remain coupled to the bracket member in each of the released position and engaged position.

14. The toe clip of claim 13 wherein the bracket member includes a first flange and a second flange disposed parallel to the first flange, and the release member includes a first and a second ear member, the first and second ear members being disposed generally parallel to each other and to the first and second flanges.

15. The toe clip of claim 14 wherein each of the first flange, second flange, first ear and second ear include an aperture, the apertures of the flanges and ears being aligned for receiving the hinge means for hingedly coupling the release member to the bracket member.

16. The toe clip of claim 15 further comprising a pair of fastener members for fastening the bracket member to the lateral leg of the pedal.

17. The toe clip of claim 16 further comprising a magnet member fixedly coupled to the bracket member, and releasably, magnetically coupled to the release member.

* * * * *